United States Patent [19]

Hilaire

[11] 3,940,103

[45] Feb. 24, 1976

[54] APPARATUS FOR INJECTION MOLDING A TAMPER-PROOF PLASTIC CAP

[75] Inventor: Fernand Hilaire, Monte Carlo, Monaco

[73] Assignee: Captocap Limited, Vaduz, Liechtenstein

[22] Filed: Feb. 7, 1975

[21] Appl. No.: 547,985

[30] Foreign Application Priority Data

Feb. 21, 1974 France .............................. 74.05926

[52] U.S. Cl. ....................... 249/68; 249/59; 249/74; 425/438; 425/443

[51] Int. Cl.² ............................................ B29F 1/14

[58] Field of Search........ 249/66 R, 66 A, 66 C, 67, 249/68, 74, 59, 136; 425/438, 437, 443; 164/216

[56] References Cited

UNITED STATES PATENTS

| | | | |
|---|---|---|---|
| 2,583,093 | 1/1952 | Emmert et al. | 425/438 |
| 2,799,049 | 7/1957 | Wilson | 249/68 |
| 2,860,374 | 11/1958 | Harrison et al. | 425/437 |
| 3,125,801 | 3/1964 | Fields | 249/68 |
| 3,482,814 | 12/1969 | Hedgewick | 249/67 |
| 3,555,606 | 1/1971 | Hedgewick | 249/66 |
| 3,660,001 | 5/1972 | Roehr | 425/438 |
| 3,853,451 | 12/1974 | Bendzick | 425/443 |

*Primary Examiner*—J. Howard Flint, Jr.
*Assistant Examiner*—Carl Rowold

[57] ABSTRACT

This invention relates to a plastic closure or cap-type stopper of which the outer skirt has formed on its inner surface a plurality of ribs adapted to engage the top ring and the grooves of the neck of the container to be stopped, on either side of a partially tearable guaranty strip bounded by circular thinning grooves formed in the inner surface of the skirt.

The mold for manufacturing this closure comprises underneath a fixed plate formed with holes for the passage of the ejection ring and ejection shaped sleeve of a sliding plate perforated like the fixed plate and actuated by a pusher, and above a sliding impression plate of which the perforation corresponding to the preceding ones bounds the injection chamber for the closure skirt on the core, said sliding impression plate being actuated by a pusher for releasing the closure from the mold impression at the end of its stroke.

3 Claims, 8 Drawing Figures

APPARATUS FOR INJECTION MOLDING A TAMPER-PROOF PLASTIC CAP

BACKGROUND OF THE INVENTION

The present invention relates to the manufacture of tamper-proof, fluid-tight, captive plastic closure of the type comprising a cap portion having a flat, bulged or cup-shaped bottom, an outer skirt provided with a guaranty strip adapted to be at least partially torn off, fitted between the cap edge and a retaining ring, and a ribber internal contour adapted to co-act with a matching ribbed external contour of the neck of the container to be stopped by means of this closure.

The manufacture of closures of this type requires the use of two-section moulds having lateral shells on either side of the vertical joint plane. In fact, after the removal of the upper portion of the mould having a contour corresponding to the cap contour, the side faces of this cap must be uncovered to permit the release of the skirt with its guaranty strip bounded by two circular grooves formed externally and corresponding to a substantial reduction in the cross-sectional area of the closure material. Now the manufacture of these mould shells requires a high standard of precision. Therefore, they are relatively expensive and nevertheless burrs of plastic material are likely to develop even under normal service conditions. Moreover, the use of such shells increases the risk of failures during the mould operation, for they are extremely fragiles and their wear involves and expensive replacement thereof at regular time intervals. Furthermore, in a given injection press type, the over-all dimensions of the mould shells limits detrimentally the number of moulding cavities or impressions that can be formed in one mould.

Now the present invention provides a modified mould structure and arrangement permitting of eliminating the above-defined mould shells while forming on the closure plain lateral surfaces preventing any tampering with the guaranty strip, with substantial production savings and an appreciable improvement in the manufacturing efficiency.

SUMMARY OF THE INVENTION

In the mould according to this invention the lower portion of the mould comprises as conventional an ejection ring adapted to slide on the shaped core, but according to an original feature of the present invention this sliding movement takes place along a stroke equal to the height of the closure skirt due to the guiding action exerted on the heel of a sliding sleeve interposed between said core and said ejection ring, in a cavity having the same height as the base plate of the device. Morever, under the movable mould impression plate responsive to the conventional compensation plate there is inserted perforated a plate in which a number of bores corresponding to the number of moulding cavities or impressions are formed, the function of these bores consisting in guiding laterally the ejection ring during its operative stroke, the thickness of the impression plate corresponding to the ejection stroke.

According to a specific feature characterizing this invention, the fixed core comprises on its outer surface, in the known fashion, ribs corresponding to those formed on the neck of the container, adapted to constitute the grooves and beads of the closure skirt as well as the tear-off or ripping strip of which the thinning or tear-off lines are formed on the inner surface of the closure skirt, the outer surface thereof remaining plain.

The closure formed by injection-moulding the plastic material between the core, the upper mould section and the impression plate at the usual and necessary temperature is ejected in two steps: in a first step, after removing the upper mould section, the ejection ring, its supporting plate and the sliding sleeve are pushed simultaneously upwards, along a stroke corresponding to the height of the closure skirt, which is the same as the stroke of the impression plate. Then, at the end of its stroke the sleeve abutes against the bottom of the recess provided for the base plate, and remains in this position. The movable plate supporting the ejection ring continuous its progression under a resilient force, together with the compensation plate, thus causing the upward movement of said ejection ring and the removal of the closure from the core, with the closure still at a softening temperature. Finally, the compensation plate pushes the impression plate, thus definitively releasing the closure. If desired, a jet of compressed air may be used to facilitate this release.

The resilient means for pushing the ejection-ring supporting plate may consist for instance of a coil compression spring, a leaf-spring, or a stack of dished spring washers engaging the compensation bar and extending through the base plate of the mould.

With this device, the closure having an internal surface of any desired configuration is safely ejected and constantly guided between the sliding sleeve and the impression and guide plate.

This mould construction eliminates the use of expensive high-precision mould shells difficult to centre and requiring a perfectly flat surface of the joint plane. The impression and guide plates require only the boring of drilled impressions or cavities.

Under these conditions it is clear that this closure, in contrast to other closures of this character, has a completely plain external skirt surface, the thinning lines which bound the tear-off ripping strip being formed on the inner surface of the closure material. Thus, any insertion of a cutting tool between the guaranty strip and the cap as frequently observed with known closures is definitely precluded, so that a really tamper-proof closure is obtained, although the tearing action takes place with the same facility as in the known arrangement.

BRIEF DESCRIPTION OF THE DRAWINGS

Now a detailed description of the lower portion of the mould for manufacturing the closure according to this invention and the closure thus obtained will be given with reference to the attached drawing, in which.

DESCRIPTION OF THE PREFERRED EMBODIMENT

Figure 1:
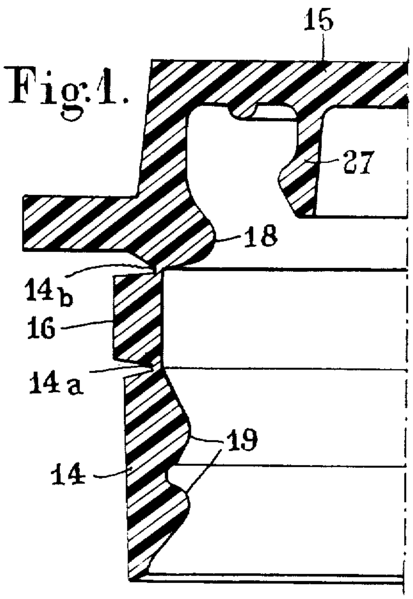
FIG. 1 is a fragmentary radial section showing the closure portion comprising a skirt with one or a plurality of internal ribs.
Figure 2:
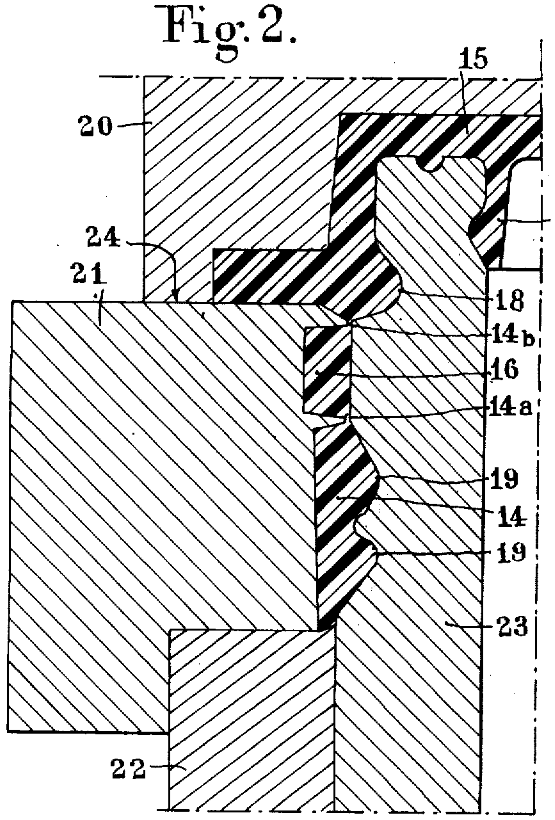
FIG. 2 is a fragmentary diagrammatic section showing the corresponding portion of a shell mould of conventional design for manufacturing this type of closure.

The present invention is concerned with a plastic closure of the tamperproof and captive type, comprising (see FIG. 1) a bottom 15 of any desired configuration, for example flat, bulged, etc. with or without an internal skirt 27 and an external skirt 14 comprising in turn at about mid-height on its outer surface a partially tearable guaranty strip 16 obtained by simply forming thinning lines 14*a*, 14*b*, the other portion of this strip constituting a hinge; besides, the internal surface of the skirt comprises two or more peripheral ribs or beads 18, 19 adapted to engage the lower portion of corresponding beads or ribs formed on the neck of the container (not shown) to be stopped by means of this closure.

The use of an injection press and shell moulds is necessary for manufacturing closures of the above-described type. In fact, to strip the above-described closure out from the mould, the shells 21 provided between the upper mould section 20 and the ejection ring 22 must be moved away from each other, the injection taking place between the core 23, the upper mould section 20, the shells 21 and ring 22. These moulds are very expensive, for the mutual fitting of parts along the joint plane 24, at the bottom and in the centre, requires a high degree of precision and the least leakage under the injection pressure causes inevitably burrs to develop on the stripped moulded article.

The closure according to the present invention departs from the one described hereinabove in that the guaranty strip 16 is obtained by properly shaping the inner surface of skirt 14 along circular thinning lines 14*a* and 14*b*, from the inside instead of from outside. In other words, the two thinning lines 14*a* and 14*b* are formed at the top and base of strip 16, respectively, on the internal surface of the closure skirt, the outer surface thereof remaining plain (see FIG. 3).

As clearly shown in the drawing, this improvement entails a better external appearance of the closure and prevents the insertion of a tool between the guaranty strip and the upper portion of the closure.

With this novel structure, it is possible to dispense with the use of shell-type moulds. However, means must compulsorily be contemplated to permit the release of the closure from the lower portion of the mould after the injection of plastic material performed between the upper and lower portions.

Figure 3:
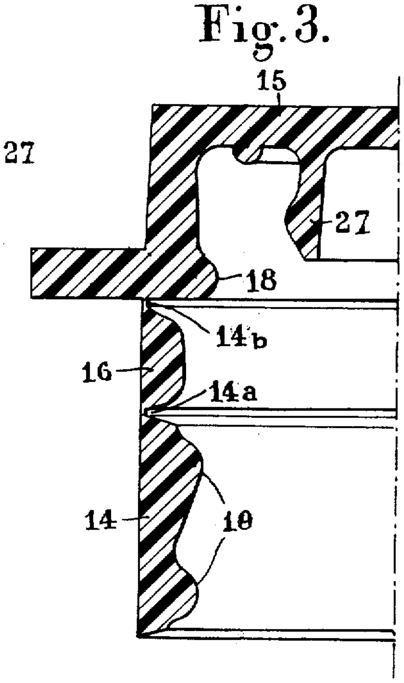
FIG. 3 is a fragmentary section of a closure according to the present invention.
Figure 4:
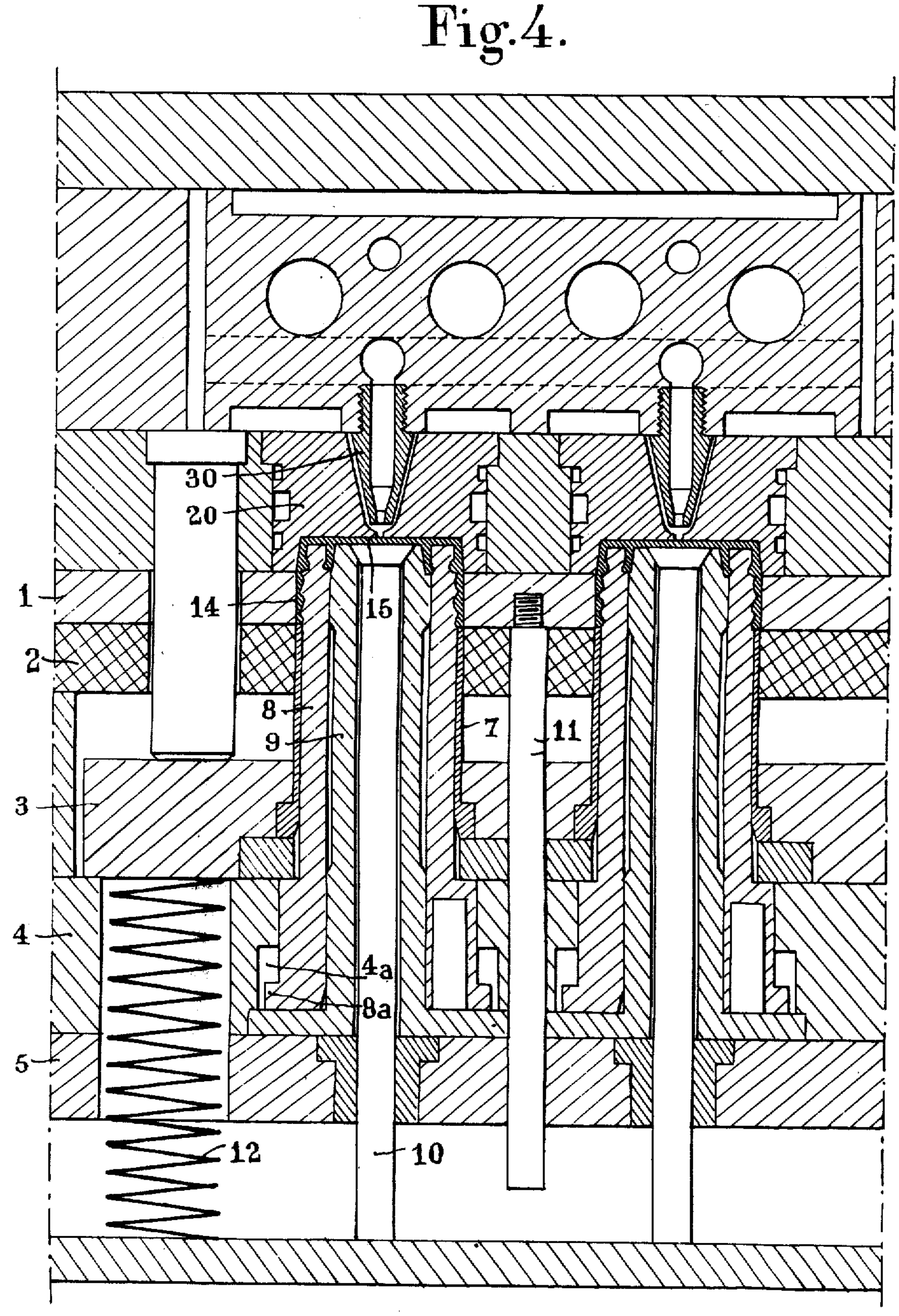
FIG. 4 is a section showing the lower portion of the mould for manufacturing the closure according to this invention.

To this end, the mould according to the present invention (FIG. 4) for manufacturing the closure depicted in FIG. 3 comprises an upper portion 20 with the injection nozzles 30 and the known components associated therewith, and a lower portion. This lower portion comprises a movable plate 1 having as many gauged orifices as there are impression cavities in the mould structure, an underlying fixed guide plate 2, the movable ejector supporting plate 3 also disposed thereunder, the central core 9, a base plate 5 supporting the core 9, the ejection compensation plate 6 and the ejection ring 7 rigid with plate 3.

The compensation plate 6 is adapted to actuate with the proper timing the push member 11 of the impression plate 1, and a coil compression spring 12 interposed between the supporting plate 3 and compensation plate 6 is adapted to push the supporting plate 3 for actuating the ejection ring 7.

According to this invention, the ejection ring 7 is guided from inside by means of a sleeve 8 adapted to slide freely on core 9 and provided at its base with a heel 8*a* adapted to slide in a groove 4*a* formed at the base of the fixed, core-supporting plate 4. The height A of this groove 4*a* is equal to the thickness of the impression plate 1 and corresponds to the height of the lower portion of the closure skirt.

The method of manufacturing a closure by means of this modified mould will now be described hereinafter with reference to FIGS. 5 – 8 of the drawings.

Figure 5:
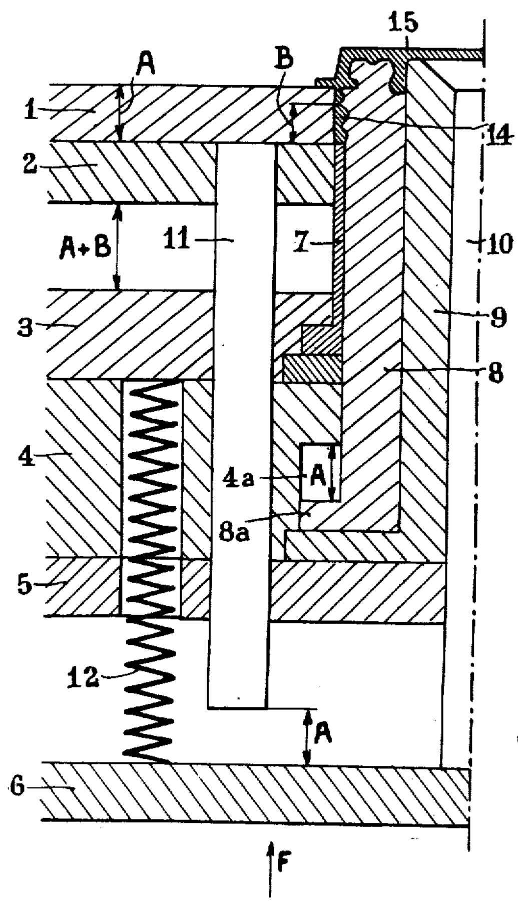
FIG. 5 is a sketch showing in section the lower portion of the mould after the ejection step.

In FIG. 5 the mould is shown without its upper portion. The lower portion comprises a core 9 and the ejection ring 7 guided from within by the sleeve 8 and from outside by aligned bores formed in the fixed plate 2 and impression plate 1. The closure 14, 15 is positioned on the sleeve 8 sliding on the fixed core 9 after the injection step between the upper and lower mould portions.

Figure 6:
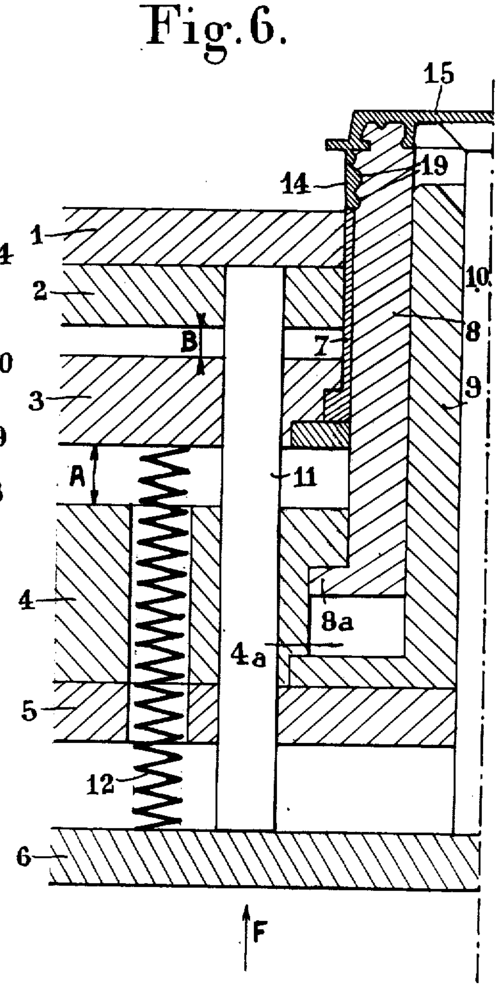
FIGS. 6, 7 and 8 are other sketches to which reference will be made for explaining the mode of operation of the mould modified according to the teachings of this invention.

FIG. 6 corresponds to the first ejection stage. The upper portion of the mould is removed, and a force F is exerted on the compensation plate 6 to compress the spring 12, whereby this spring will force the plate 3 rigid with the ejection ring 7 upwards.

The upper portion of this ring 7 engages and pushes the skirt 14 of the closure outwards. The sleeve 8 clamped by the rib or ribs 19 formed on the closure is driven upwards through a distance corresponding to the stroke A by sliding on the fixed central core 9.

At the end of this stroke A, the sleeve 8 is stopped by its heel 8*a* and thus the lower portion of skirt 14 is level with the top surface of impression plate 1.

The mould is then in the position shown in FIG. 6.

Figure 7:
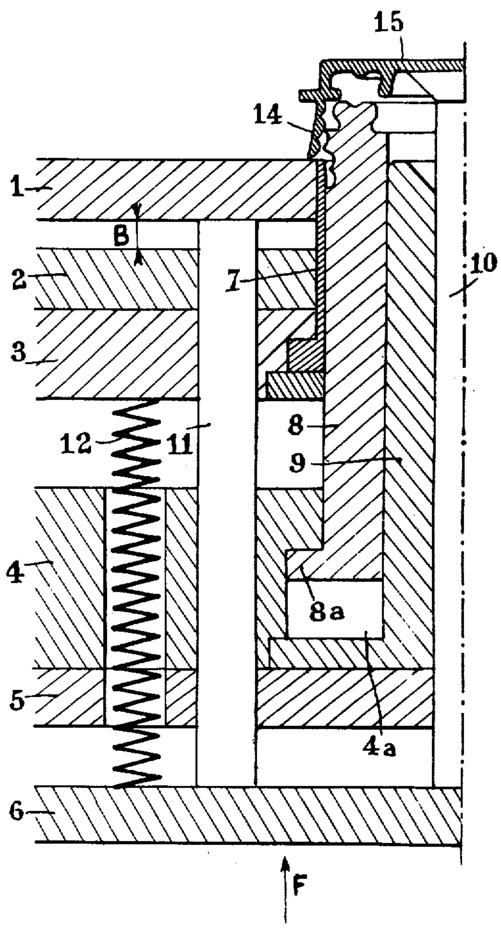
Figure 8:
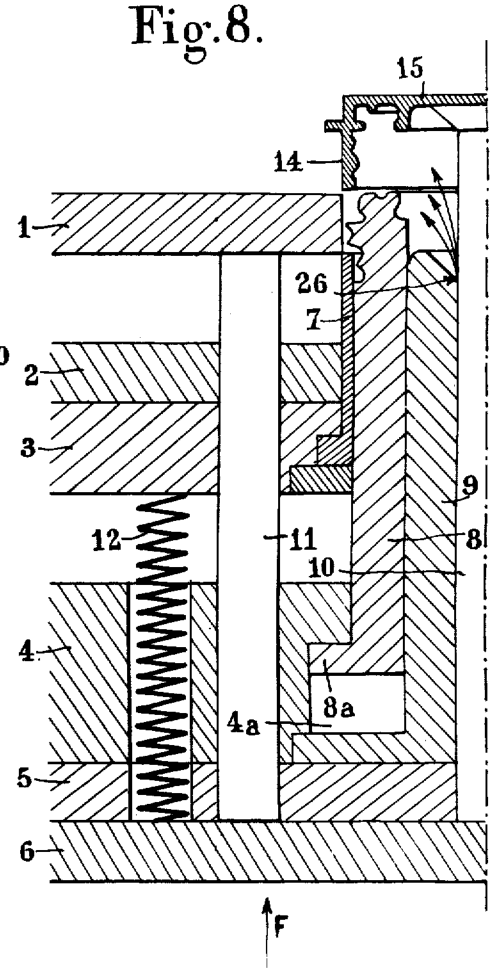

FIG. 7 corresponds to the second ejection stage.

The force F is still urging the compensation plate 6 upwards and the sleeve 8 is still retained by its heel 8*a*. The plate 1 pushed by push member 11 rises jointly with the ejection ring 7 rigid with plate 3; thus, the impression plate 1 engages the just released closure skirt 14 and the latter is again pushed upwards by both plate 1 and ejection ring 7, whereby the closure is forced away from the ribs of sleeve 8.

It may also be noted that the closure is pushed in its central portion by the axial valve 10 reacting in turn against the compensation plate 6.

During this second ejection stage the ejection proper takes place along the stroke B. This distance B corresponds to the permissible free movement of ejection ring 7 along sleeve 8 and also to the collar height of skirt 14.

Therefore, the total stroke of ejection plate 3 corresponds to A + B, i.e. to the height of the closure skirt plus the collar height. Thus, the top surface of supporting plate 3 carrying the ring 7 engages the lower face of the fixed plate 2 and the ejection by means of ring 7 is stopped; under these conditions, the mould is in the position shown in FIG. 7.

As the compensation plate 3 continues its upward movement, the plate 3 prevented from rising beyond the position illustrated by the fixed plate 2 causes the spring 12 to be compressed, and only the impression plate 1 is pushed upwards together with the axial valve 10, whereby the closure is released completely.

Any risk of jamming the ejection ring 7 between the closure skirt 14 and the core sleeve 8 is positively precluded, since this ejection ring 7 is no more operative. During the preceding or first period of the ejection this jamming was also positively precluded since the ring 7 was retained internally between the shaped sleeve 8 and the bores formed in the impression plates 1 and guide plates 2.

Of course, all the steps described hereinabove take place as a continuous movement.

A blast of compressed air delivered for example through a passage 26 along the axial valve 10 may be used for ensuring a complete ejection of the moulded closure while preventing the latter from falling back and interfere with the valve.

The various elements of the mould are restored to their initial positions as a consequence of the pressure exerted thereon when reclosing the mould, this pressure being applied to the plate 1 and through pushers acting on plate 3.

What is claimed as new is:

1. Mold for manufacturing a plastic closure comprising an external skirt formed with internal ribs corresponding to the ring portion and grooves of the neck of the container to be stopped, and bounding a guaranty strip partially tearable due to circular thinning grooves formed on the inner surface of said skirt, said mold comprising a compensation plate, a fixed base plate overlying said compensation plate, a sliding plate above said fixed plate, a resilient pusher between said base plate and said sliding plate, a cylindrical ejection ring solid with said sliding plate, a cylindrical core solid with said base plate, a shaped sleeve adapted to slide freely on said core and guided by an integral heel portion, said ejection ring being movable through a height equal to that of said notch formed in said base plate, a fixed plate disposed above said supporting plate and comprising holes for guiding said sleeve and ejection ring, an impression plate disposed above said fixed plate and formed with holes corresponding to the holes of said fixed plate, a push member secured to said impression plate and adapted to be actuated by said compensation plate, and a chamber defined between said impression plate and said sliding sleeve above said ejection ring and into which the plastic material is adapted to be injected.

2. Mold as set forth in claim 1, wherein the distance between said ejection ring supporting plate, in the inoperative position thereof, and the overlying fixed plate above which the impression plate is adapted to slide, is equal to the height of the notch formed in said base plate plus the height of the closure skirt, whereby when said push member has pushed the ring solid with said shaped sleeve to the ejection position can actuate said impression plate for releasing the closure skirt from the shaped portion of said sleeve.

3. Mold as set forth in claim 1, wherein the height of the base plate cavity which determines the stroke of said ejection ring is equal to the thickness of said impression plate, to the relative spacing between said compensation plate and the push member shank in the inoperative position, and to the height of the closure skirt.

* * * * *